United States Patent
Eikenberry et al.

(10) Patent No.: US 9,696,408 B2
(45) Date of Patent: Jul. 4, 2017

(54) ROBUST INTEGRATED PRECISION HIGH-SPEED SATELLITE ATTITUDE DETERMINATION AND CONTROL SYSTEM (ADCS)

(71) Applicant: UNIVERSITY OF FLORIDA RESEARCH FOUNDATION, INC., Gainesville, FL (US)

(72) Inventors: Stephen Scott Eikenberry, Gainesville, FL (US); Norman G. Fitz-Coy, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 338 days.

(21) Appl. No.: 14/614,140

(22) Filed: Feb. 4, 2015

(65) Prior Publication Data
US 2015/0219744 A1    Aug. 6, 2015

Related U.S. Application Data

(60) Provisional application No. 61/935,652, filed on Feb. 4, 2014.

(51) Int. Cl.
*G01S 3/786* (2006.01)
*G01S 5/16* (2006.01)
(Continued)

(52) U.S. Cl.
CPC ............ *G01S 5/163* (2013.01); *G01S 3/7862* (2013.01)

(58) Field of Classification Search
CPC ..... G01S 5/163; G01S 3/7862; G01C 11/025; G01C 11/02; H04N 7/005; H04N 7/18; H04N 7/181
See application file for complete search history.

(56) References Cited

U.S. PATENT DOCUMENTS 6,184,825 B1 * 2/2001 Wehner ............... H01Q 3/02
                                                   342/358
6,272,432 B1    8/2001 Li et al.
(Continued)

OTHER PUBLICATIONS

Eikenberry, S., et al., "Stabilized-sPeckle Integral Field Spectroscopy—SPIFS", Proc. of SPIE 7014, Ground-based and Airborne Instrumentation for Astronomy II, Jul. 10, 2008, vol. 7014, pp. 70145P1-70145P8, SPIE, USA.
(Continued)

*Primary Examiner* — Sath V Perungavoor
*Assistant Examiner* — Howard D Brown, Jr.
(74) *Attorney, Agent, or Firm* — Alston & Bird LLP

(57) ABSTRACT

Various embodiments of the present invention provide methods, systems, apparatus, and computer program products for providing integrated attitude determination and attitude control for slewing of a satellite. In one embodiment a method is provided. The method comprises after receiving a repointing request, selecting a guide star sample comprising one or more guide stars from a guide star catalog; determining current attitude information; selecting and retrieving at least one point spread function (PSF) image from a PSF library; estimating an expected position for at least one guide star, the at least one guide star being one of the guide stars of the guide star sample; acquiring at least one star tracker image; calculating a cross-correlation function (CCF) to determine shifts in position of the at least one guide star compared to the expected position; and determining updated current attitude information based at least in part on the determined shifts in position.

43 Claims, 9 Drawing Sheets

(51) Int. Cl.
*G01B 11/14* (2006.01)
*B64G 1/36* (2006.01)

(56) References Cited

U.S. PATENT DOCUMENTS

| | | | |
|---|---|---|---|
| 6,285,927 B1 | 9/2001 | Li et al. | |
| 6,289,268 B1* | 9/2001 | Didinsky | G05D 1/0883 |
| | | | 244/164 |
| 6,523,786 B2 | 2/2003 | Yoshikawa et al. | |
| 7,136,752 B2 | 11/2006 | Needelman et al. | |
| 7,260,456 B2 | 8/2007 | Fowell et al. | |
| 7,451,022 B1 | 11/2008 | Luk-Paszyc et al. | |
| 7,487,016 B2 | 2/2009 | Fowell et al. | |
| 8,041,118 B2 | 10/2011 | Fowell | |
| 8,380,370 B2 | 2/2013 | Liu et al. | |
| 8,401,307 B1 | 3/2013 | Rowe et al. | |
| 2003/0048221 A1* | 3/2003 | Tseng | G01S 3/38 |
| | | | 342/357.36 |
| 2007/0046537 A1* | 3/2007 | Tekawy | G01S 19/02 |
| | | | 342/358 |
| 2012/0173143 A1 | 7/2012 | Belenkii et al. | |
| 2012/0199697 A1* | 8/2012 | Nagabhushan | B64G 1/286 |
| | | | 244/165 |
| 2012/0261513 A1* | 10/2012 | Bresciani | B64G 1/1085 |
| | | | 244/158.4 |
| 2013/0193303 A1* | 8/2013 | Smith | G01C 21/24 |
| | | | 250/203.6 |

OTHER PUBLICATIONS

Keremedjiev, M., et al., "On-Sky Demonstration of Optical Speckle Stabilization Using the SPIFS-POC", Proc. SPIE 7735, Ground-based and Airborne Instrumentation for Astronomy III, Jul. 15, 2010, vol. 7735, pp. 77351S1-77351S10, SPIE, USA.

* cited by examiner

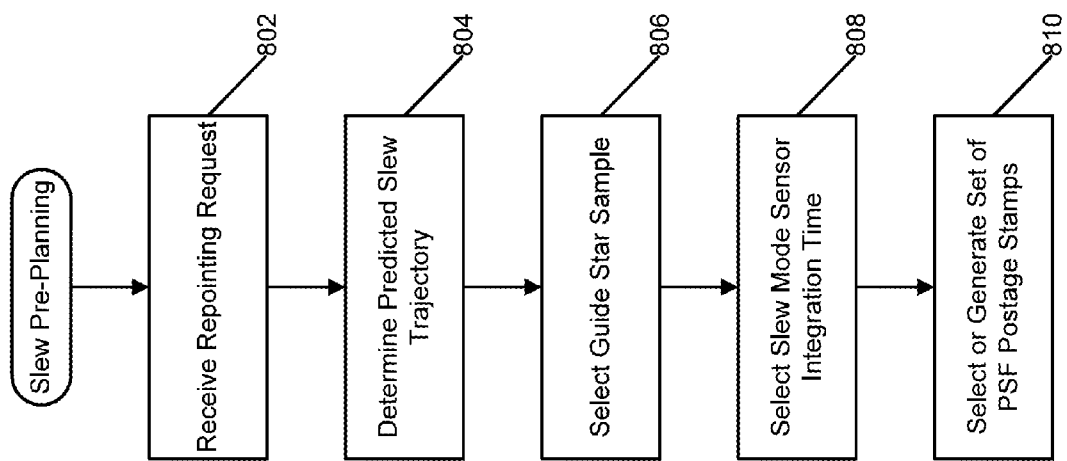

ROBUST INTEGRATED PRECISION HIGH-SPEED SATELLITE ATTITUDE DETERMINATION AND CONTROL SYSTEM (ADCS)

CROSS-REFERENCE TO RELATED APPLICATIONS

The present application claims the benefit of and priority to U.S. Provisional Patent Application No. 61/935,652, filed on Feb. 4, 2014, which is incorporated herein by reference in its entirety.

RELATED FIELD

Various embodiments of the present invention are directed toward providing a robust integrated precision high-speed attitude determination and control system (ADCS) for satellites. Satellite ADCS are a crucial technology for everything from small satellites to major communications and remote sensing platforms based in space.

BACKGROUND

Many modern and known satellite ADCS are based on "star tracker" or telescope-based technology, which may be coupled with reaction wheel or control gyroscope subsystems for attitude control. Such conventional star tracker systems and subsystems thus incorporate a telescope mounted to a satellite, with the telescope being configured to take images of stars viewable thereby in orbit. In this manner, the images captured by the telescope enable determination of the orientation of the telescope and thus the satellite to which it is mounted.

Upon determination of attitude, attitude control is necessary to properly steer, redirect, repoint, or otherwise move satellites and the systems and/or telescopes mounted thereto. Challenges exist with the ability to slew quickly, but also under control. Thus, at one time, slewing with the satellite turned on was simply avoided. Instead, the satellite would simply be turned off during reorientation to a new direction. It could then be turned back on, the viewable stars scanned and compared to star tracker based and stored images, based upon which it could be determined whether the satellite is or is not positioned in the desired direction. As would be expected, such approaches were time-intensive and generally duplicative as validation would more often than not determine that the satellite needs further repositioning due to errors or otherwise.

In more recent years alternative systems and methods of attitude control have been implemented, whereby, for example, if movement is maintained at a sufficiently slow rate the star tracker may be kept on during movement. Recalculation of position may occur repeatedly, providing the star tracker can focus upon and identify a single star for extrapolation. Thus, knowledge of orientation may be maintained throughout slewing, thus reducing at least certain of the inaccuracies and inefficiencies with systems such as the "on/off" one described above. Challenges, however, remain as slewing speed had to be sacrificed to maintain accuracy of determinations during slewing. Still further, such techniques were oftentimes cumbersome and/or unworkable with smaller sized satellites. Thus, a need exists for a consolidated, accurate, and efficient system and method for attitude determination and attitude control during satellite slewing operations.

BRIEF SUMMARY

Various embodiments of the present invention provide methods, systems, apparatus, and computer program products for robust and efficient satellite attitude determination and control. One aspect of the present invention provides a computer-implemented method for providing integrated attitude determination and attitude control for slewing of a satellite. The method comprises, after receiving a repointing request, selecting, via one or more processors, a guide star sample comprising one or more guide stars from a guide star catalog, wherein each guide star selected for the guide star sample has a measured brightness brighter than a predetermined value; determining, via the one or more processors, current attitude information; selecting and retrieving, via the one or more processors, at least one point spread function (PSF) image from a PSF library, the selection based at least in part on the current attitude information; estimating, via the one or more processors and based at least in part upon the current attitude information, an expected position for at least one guide star, the at least one guide star being one of the guide stars of the guide star sample; acquiring, via one or more processors and at least one image capture device on the satellite, at least one star tracker image; calculating, via the one or more processors, a cross-correlation function (CCF) based on a sub-image of the selected and retrieved PSF image, the star tracker image, and the expected position for the at least one guide star, the calculation determining shifts in position of the at least one guide star compared to the expected position; and determining, via the one or more processors, updated current attitude information based at least in part on the determined shifts in position.

Another aspect of the present invention provides an integrated attitude determination and attitude control system for use on a satellite. The system comprises a memory configured to store information associated with the satellite; and one or more processors configured to, upon receipt of a repointing request, select a guide star sample comprising one or more guide stars from a guide star catalog, wherein each guide star selected for the guide star sample has a measured brightness brighter than a predetermined value; determine current attitude information; select and retrieve at least one point spread function (PSF) image from a PSF library, the selection based at least in part on the current attitude information; estimate, based at least in part upon the current attitude information, an expected position for at least one guide star, the at least one guide star being one of the guide stars of the guide star sample; acquire, via at least one image capture device on the satellite, at least one star tracker image; calculate a cross-correlation function (CCF) based on a sub-image of the selected and retrieved PSF image, the star tracker image, and the expected position for the at least one guide star, the calculation determining shifts in position of the at least one guide star compared to the expected position; and determine updated current attitude information based at least in part on the determined shifts in position.

In still another aspect of the present invention, a non-transitory computer program product comprising at least one computer-readable storage medium having computer-readable program code portions embodied therein is provided. The computer-readable program code portions comprise an executable portion configured for, after receiving a repointing request, selecting a guide star sample comprising one or more guide stars from a guide star catalog, wherein each guide star selected for the guide star sample has a measured brightness brighter than a predetermined value; an executable portion configured for determining current attitude information; an executable portion configured for selecting and retrieving at least one point spread function (PSF) image from a PSF library, the selection based at least in part on the current attitude information; an executable portion configured for estimating, based at least in part upon the current attitude information, an expected position for at least one guide star, the at least one guide star being one of the guide stars of the guide star sample; an executable portion configured for acquiring, via at least one image capture device on the satellite, at least one star tracker image; an executable portion configured for calculating a cross-correlation function (CCF) based on a sub-image of the selected and retrieved PSF image, the star tracker image, and the expected position for the at least one guide star, the calculation determining shifts in position of the at least one guide star compared to the expected position; and an executable portion configured for determining updated current attitude information based at least in part on the determined shifts in position.

BRIEF DESCRIPTION OF THE DRAWINGS

Figure 1:
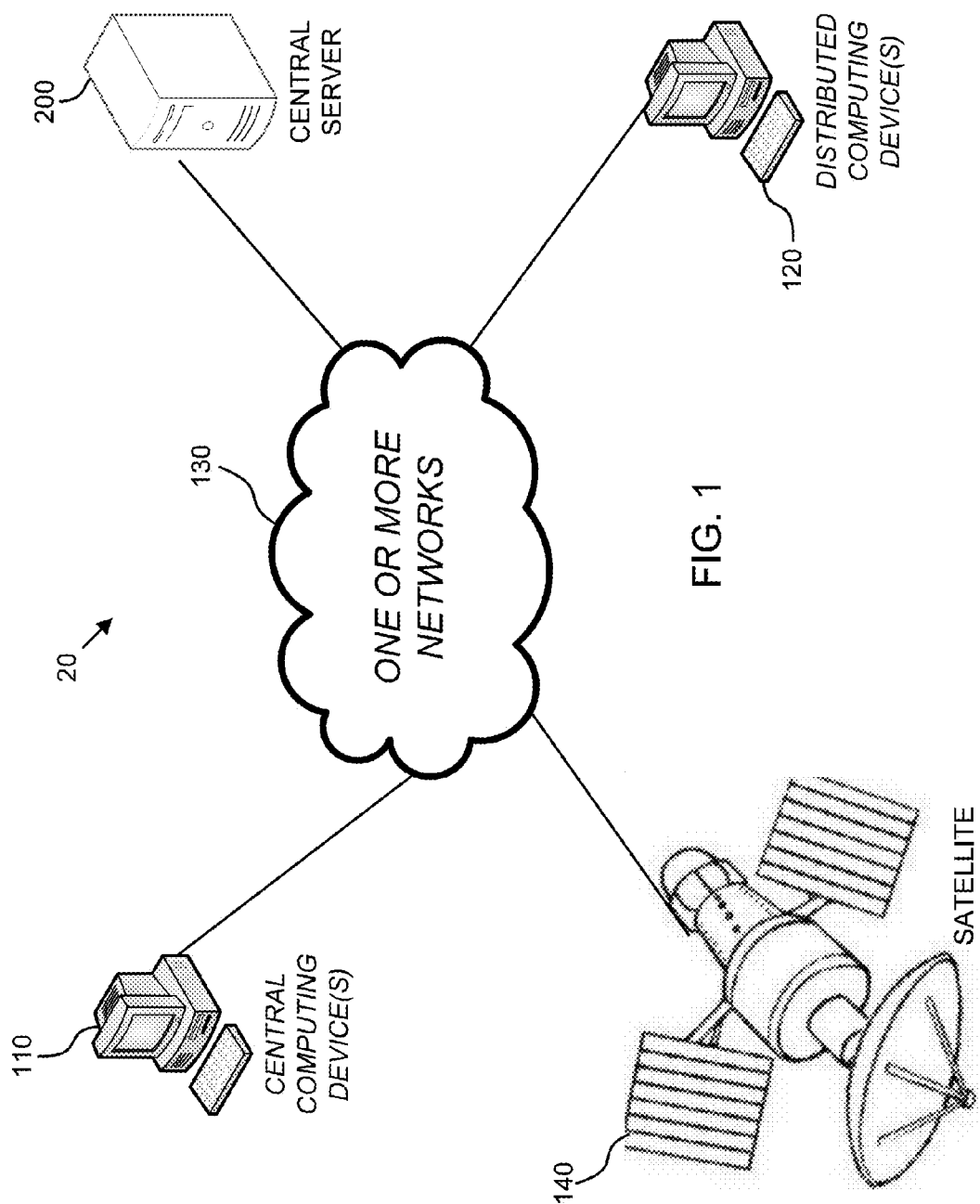
Figure 2:
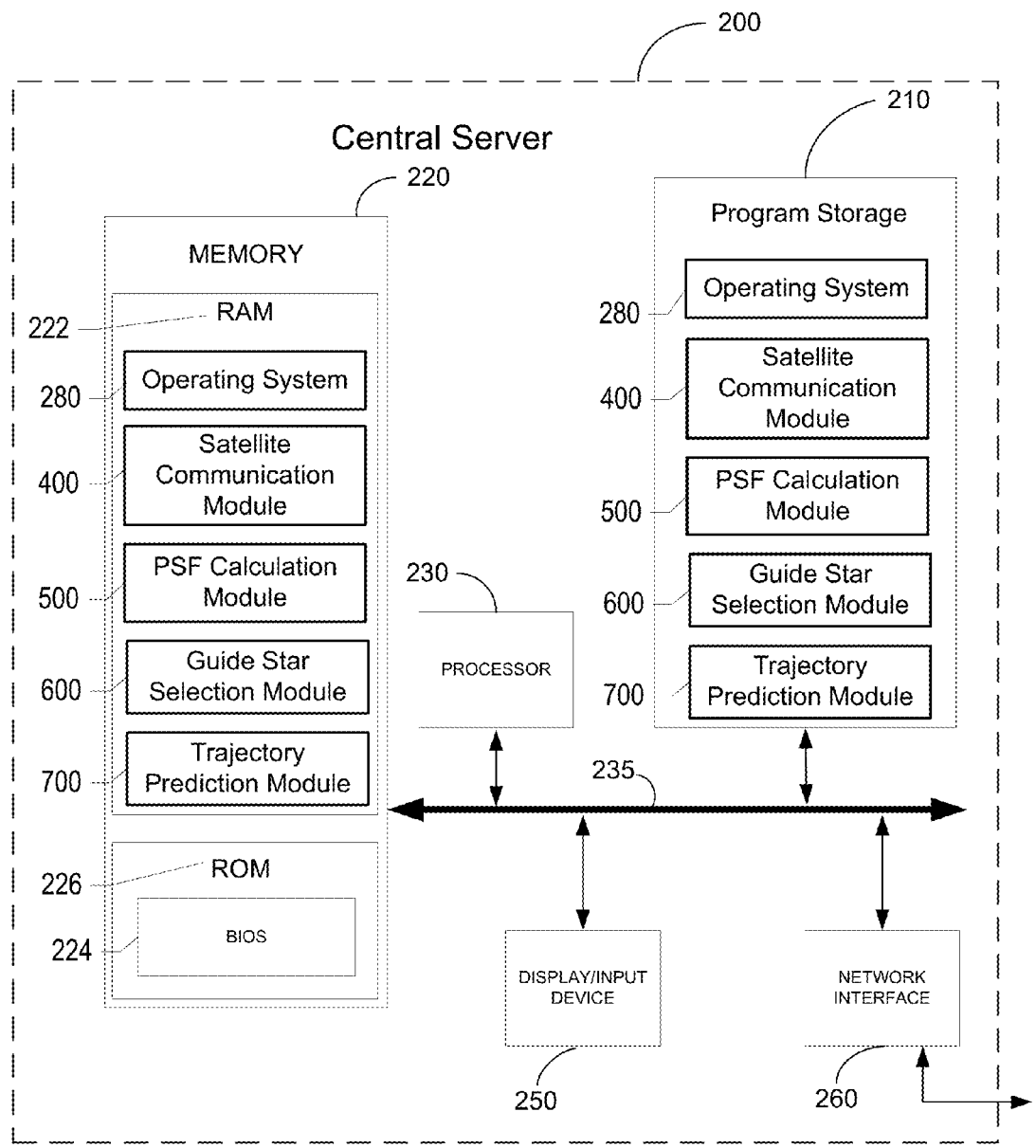
Figure 3:
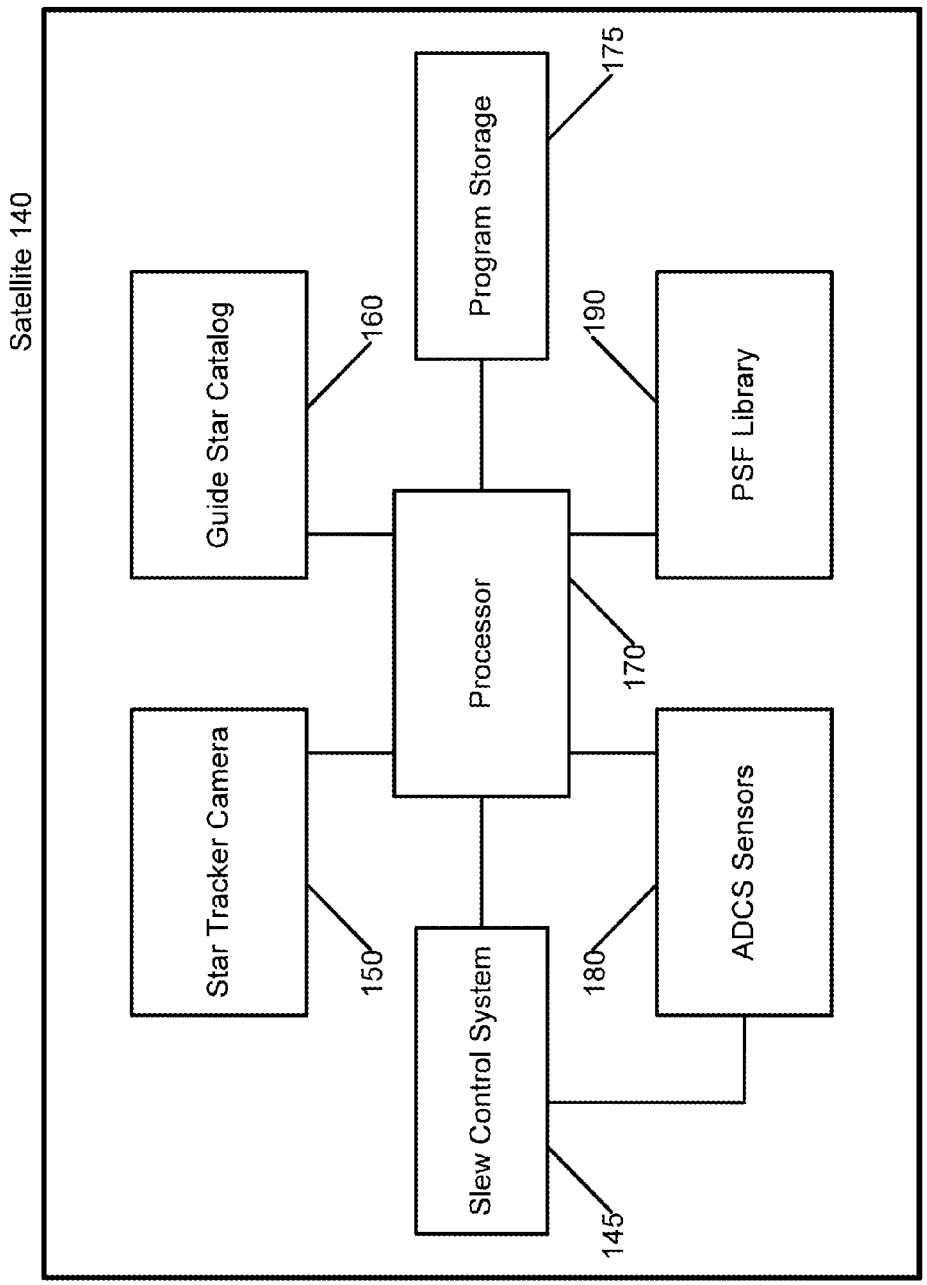
Figure 4B:
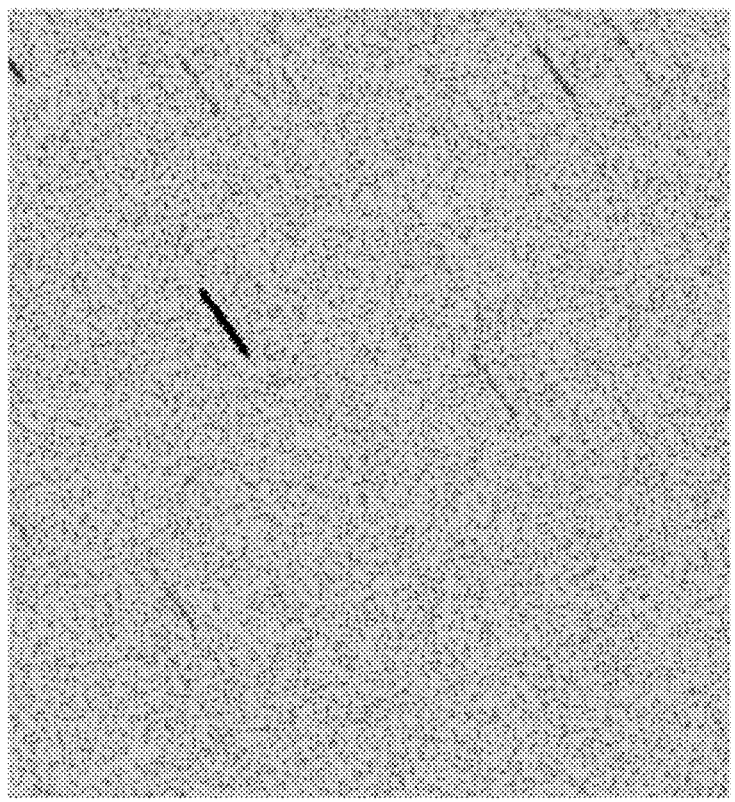
Figure 4A:
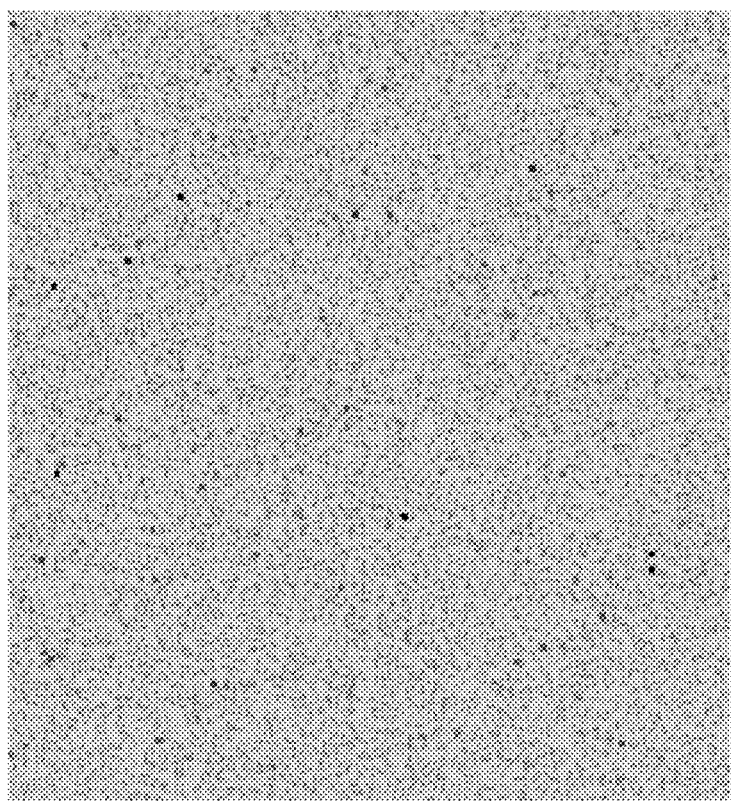
Figure 6:
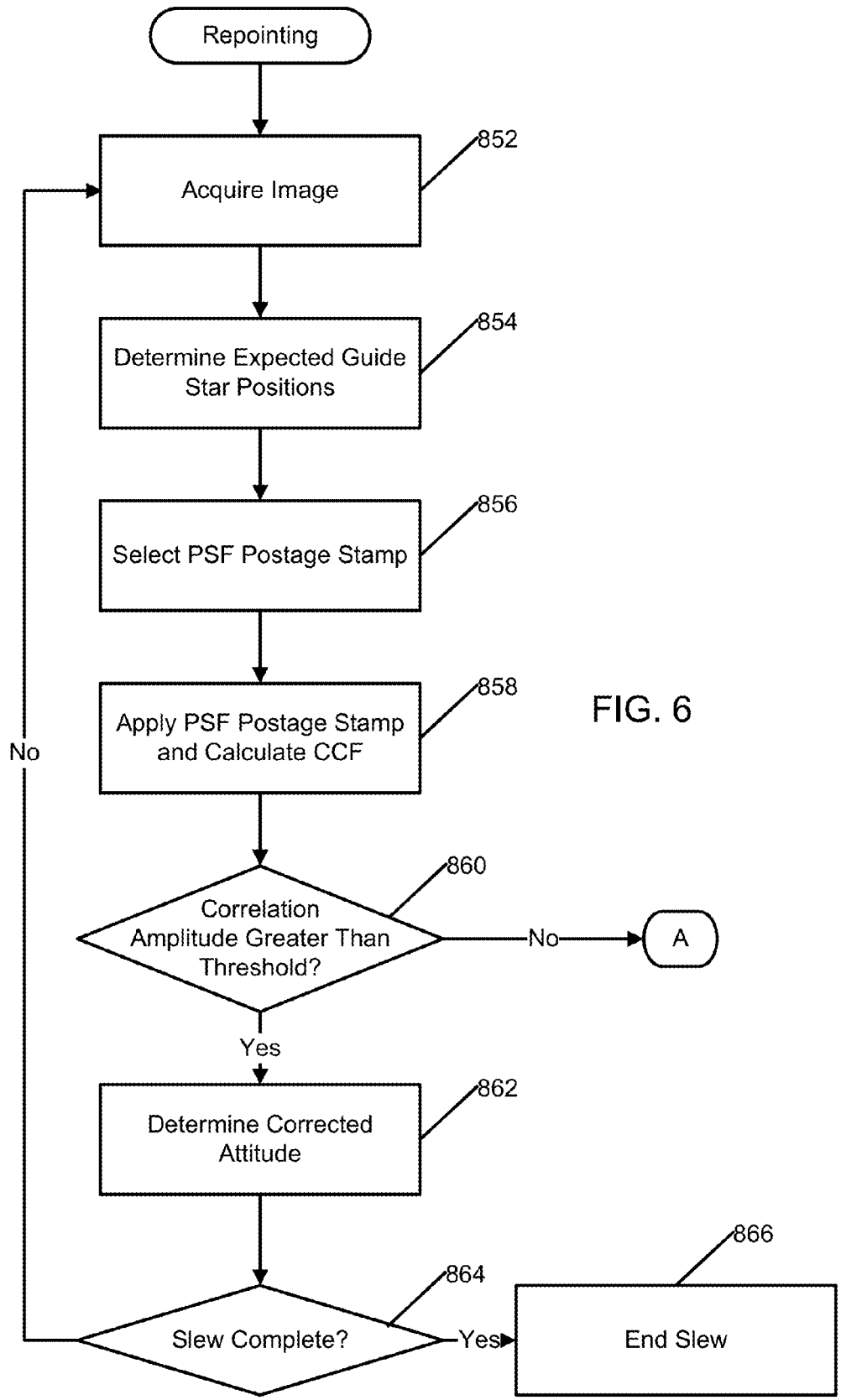
Figure 7A:
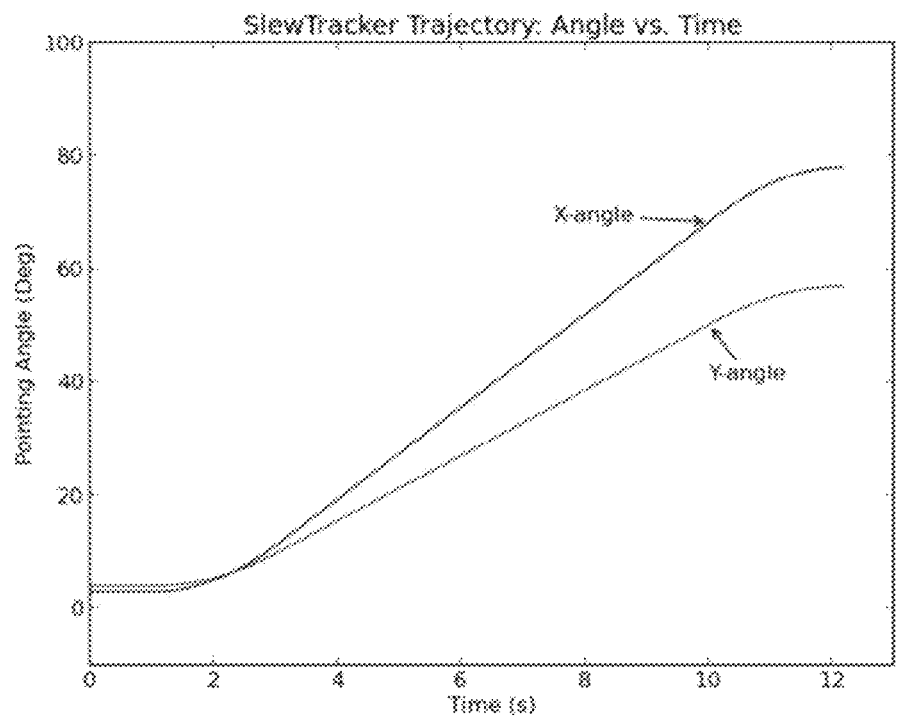
Figure 7B:
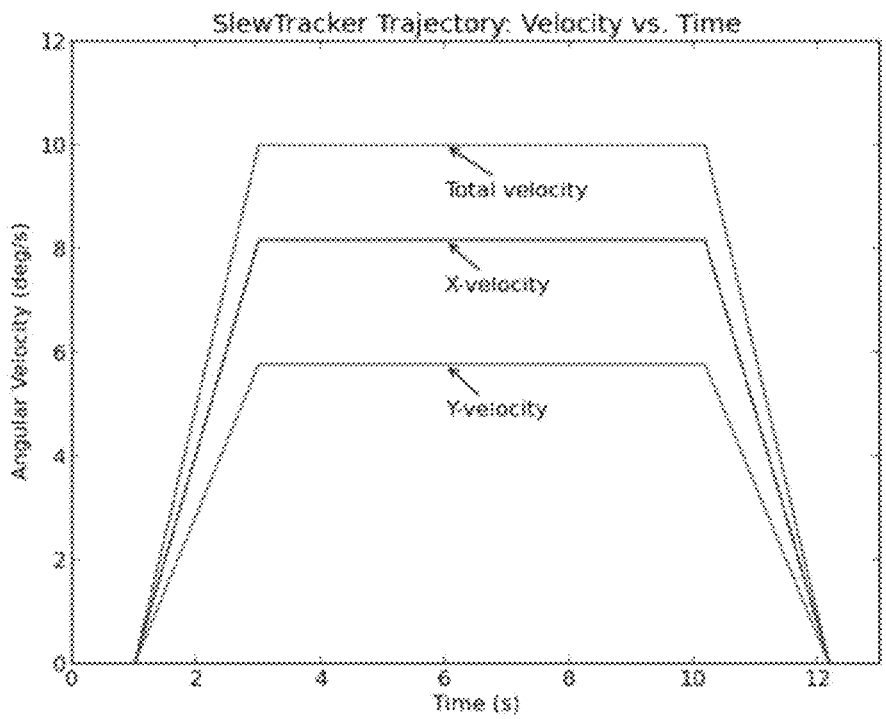
Figure 7C:
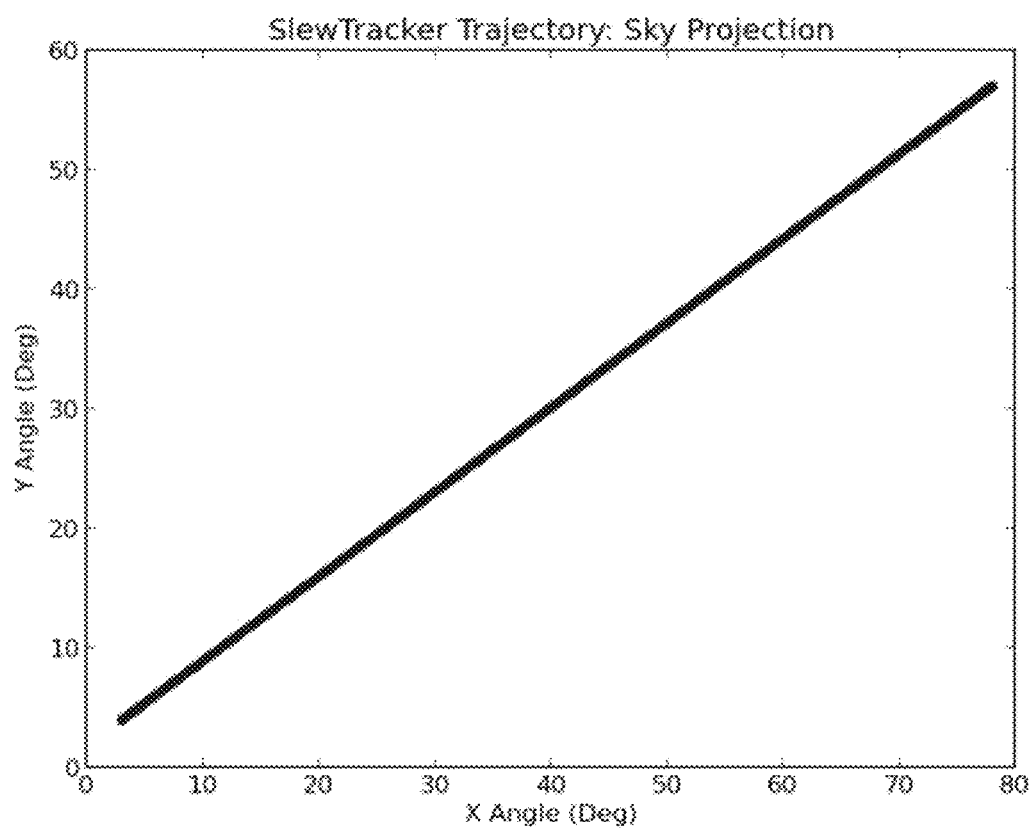
Figure 8:
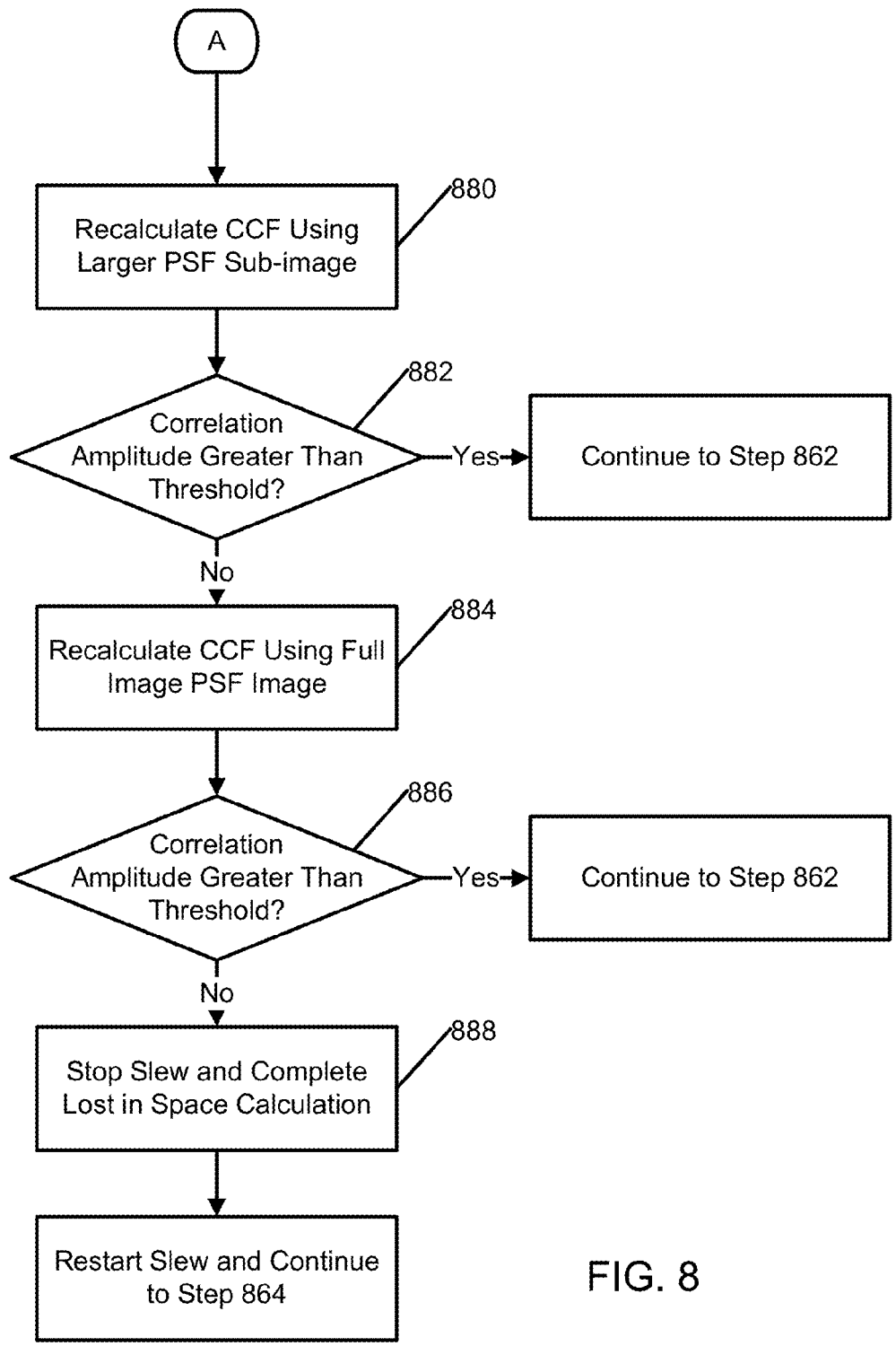

Having thus described the invention in general terms, reference will now be made to the accompanying drawings, which are not necessarily drawn to scale, and wherein:

FIG. 1 is a block diagram of an exemplary robust integrated precision high-speed attitude determination and control system (ADCS) system 20 according to various embodiments;

FIG. 2 is schematic block diagram of a server 200 associated with the system 20 according to various embodiments;

FIG. 3 is a schematic block diagram of a satellite 140 according to various embodiments;

FIGS. 4A and 4B are example star tracker images captured when the slew velocity is 0 degrees per second (FIG. 4A) and when the slew velocity is 10 degrees per second (FIG. 4B;

FIGS. 5, 6, and 8 are flowcharts illustrating some of the processes and procedures that may be completed in accordance with various embodiments; and FIGS. 7A, 7B, and 7C illustrate an example planned slew trajectory in accordance with various embodiments.

DETAILED DESCRIPTION OF VARIOUS EMBODIMENTS

Various embodiments of the present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.
Exemplary Apparatuses, Methods, Systems, Computer Program Products, & Computer Entities Various embodiments of the present invention may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described elsewhere herein with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Exemplary Architecture of System 20

FIG. 1 is a block diagram of an exemplary robust integrated precision high-speed attitude determination and control system (ADCS) system 20 that can be used in conjunction with various embodiments of the present invention. In at least the illustrated embodiment, the system 20 may include one or more central computing devices 110, one or more distributed computing devices 120, and at least one satellite or satellite system 140, all configured in communication with a central server 200 via one or more networks 130. While FIG. 1 illustrates the various system entities as separate, standalone entities, the various embodiments are not limited to this particular architecture.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, other wireless communication protocol, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 110-140 are illustrated in FIG. 1 as communicating with one another over the same network 130, these devices may likewise communicate over multiple, separate networks.

According to one embodiment, in addition to receiving data from the server 200, the distributed devices 110, 120, 140 may be further configured to collect and transmit data on their own. In various embodiments, the devices 110, 120, 140 may be capable of receiving data via one or more input units or devices, such as a keypad, touchpad, barcode scanner, radio frequency identification (RFID) reader, interface card (e.g., modem, etc.) or receiver. The devices 110, 120, 140 may further be capable of storing data to one or more volatile or non-volatile memory modules, and outputting the data via one or more output units or devices, for example, by displaying data to the user operating the device, or by transmitting data, for example over the one or more networks 130.

Exemplary Server 200

In various embodiments, the server 200 includes various systems for performing one or more functions in accordance with various embodiments of the present invention, including those more particularly shown and described herein. It should be understood, however, that the server 200 might include a variety of alternative devices for performing one or more like functions, without departing from the spirit and scope of the present invention. For example, at least a portion of the server 200, in certain embodiments, may be located on the distributed device(s) 110, 120, 140, as may be desirable for particular applications.

FIG. 2 is a schematic diagram of the server 200 according to various embodiments. The server 200 includes a processor 230 that communicates with other elements within the server via a system interface or bus 235. Also included in the server 200 is a display/input device 250 for receiving and displaying data. This display/input device 250 may be, for example, a keyboard or pointing device that is used in combination with a monitor. The server 200 further includes memory 220, which preferably includes both read only memory (ROM) 226 and random access memory (RAM) 222. The server's ROM 226 is used to store a basic input/output system 224 (BIOS), containing the basic routines that help to transfer information between elements within the server 200. Various ROM and RAM configurations have been previously described herein.

In addition, the server 200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 210 and/or memory of the server 200 may further provide the functions of a data storage device, which may store historical and/or current delivery data and delivery conditions that may be accessed by the server 200. In this regard, the storage device 210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 400-700) comprising, for example, one or more computer-readable program code portions executable by the processor 230, may be stored by the various storage devices 210 and within RAM 222. Such program modules may also include an operating system 280. In these and other embodiments, the various modules 400, 500, 600, 700 control certain aspects of the operation of the server 200 with the assistance of the processor 230 and operating system 280. In still other embodiments, it should be understood that one or more additional and/or alternative modules may also be provided, without departing from the scope and nature of the present invention.

In various embodiments, the program modules 400, 500, 600, 700 are executed by the server 200 and are configured to generate one or more graphical user interfaces, reports, instructions, and/or notifications/alerts, all accessible and/or transmittable to various users of the system 20. For example, satellite communication module 400 may be configured to generate, transmit and/or receive communications to or from satellite 140; point spread function (PSF) calculation module 500 may be configured to determine/calculate one or more simulated PSFs and/or populate a PSF library; guide star selection module 600 may be configured to select a reduced-set sample guide stars (referred to herein as the guide star sample), including guide stars along a planned slew trajectory and an acceptable buffer zone around the planned slew trajectory, from a guide star catalog; and trajectory prediction module 700 may be configured to determine/calculate a planned slew trajectory for slewing a satellite from a first attitude to a second attitude during a repointing event. In certain embodiments, the user interfaces, reports, instructions, and/or notifications/alerts may be accessible via one or more networks 130, which may include the Internet or other feasible communications network, as previously discussed.

In various embodiments, it should also be understood that one or more of the modules 400, 500, 600, 700 may be alternatively and/or additionally (e.g., in duplicate) stored locally on one or more of the devices 110, 120, 140 and may be executed by one or more processors of the same. For example, trajectory prediction module 700 may be stored on board the satellite 140 and executed by the on board satellite processor 170 (shown in FIG. 3). According to various embodiments, the modules 400, 500, 600, 700 may send data to, receive data from, and utilize data contained in one or more databases, which may be comprised of one or more separate, linked and/or networked databases (e.g., a guide star catalog).

Also located within the server 200 is a network interface 260 for interfacing and communicating with other elements of the one or more networks 130. It will be appreciated by one of ordinary skill in the art that one or more of the server 200 components may be located geographically remotely from other server components. Furthermore, one or more of the server 200 components may be combined, and/or additional components performing functions described herein may also be included in the server.

While the foregoing describes a single processor 230, as one of ordinary skill in the art will recognize, the server 200 may comprise multiple processors operating in conjunction with one another to perform the functionality described herein. In addition to the memory 220, the processor 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Exemplary Central Computing Device(s) 110 and Distributed Computing Device(s) 120

In various embodiments, the system 20 may comprise one or more central computing device(s) 110 and/or distributed computing device(s) 120. In one embodiment, the central computing device(s) 110 and/or distributed computing device(s) 120 may include one or more components that are functionally similar to those of the central server 200. For example, in one embodiment, the central computing device(s) 110 and/or distributed computing device(s) 120 may include one or more processing elements, one or more display device/input devices, volatile and non-volatile storage or memory, and/or one or more communications interfaces. The central computing device(s) 110 and/or distributed computing device(s) 120 may also comprise various other systems, such as data processing protocols, satellite repointing instruction protocols, and a variety of other systems and their corresponding components. The central computing device(s) 110 and/or distributed computing device(s) 120 may be in communication with the central server 200, one or more central computing device(s) 110 and/or distributed computing device(s) 120, satellite 140, and/or other computing devices.

Exemplary Satellite 140

FIG. 3 is a block diagram illustrating some of the components of an example satellite 140, in accordance with an embodiment of the present invention. In particular, the satellite 140 may be configured to complete one or more tasks related to communication, remote sensing, defense/military, and astronomy applications, to name a few non-limiting examples. The satellite 140 may comprise various hardware and/or software components configured to complete these one or more tasks. Additionally, the satellite 140 may comprise hardware and/or software components for communicating with the central server 200 or other computing device(s) (e.g., central computing device(s) 110 and/or distributed computing device(s) 120) via a wireless protocol as discussed above and as understood in the field. The satellite 140 may further comprise hardware and/or software components configured to complete procedures and tasks related to the determination and control of the attitude of the satellite. For example, as described in more detail below, the satellite 140 may include a star tracker system in communication with a slew control system.

As illustrated in FIG. 3, the satellite 140 may comprise a star tracker system having one or more processors 170, that may be similar to the processor 230 described above; one or more program storage devices 175, that may be similar to the program storage device 210 described above; and memory similar to memory 220 described above for storing a guide star catalog 160, PSF library 190, and/or the like. The processor 170 may be configured to complete calculations for attitude determination and control. For example, the processor 170 may be a low-power single board processor. In various embodiments, the program storage device 175 may store modules similar to modules 400-700 described above. Additionally, a module for determining/calculating a cross-correlation function (CCF) using, for example, Fast Fourier Transform (FFT) may be stored in the program storage device 175 on board satellite 140, in some embodiments. The program storage device 175 and memory housing the guide star catalog 160 and/or PSF library 190 may be in communication with the processor 170 via a system interface or bus. The satellite 140 may further comprise an image capture device such as a star tracker camera or telescope 150 in communication with the processor 170. Additionally, a slew control system 145 on board satellite 140 may be configured to control the slew of the satellite 140 and may be in communication with the processor 170 and one or more ADCS sensors 180. For example, the ADCS sensors 180 may comprise one or more accelerometers, gyroscopes, optical sensors, and/or the like for sensing angular momentum, and/or the like. A communication interface may be configured to provide pointing requests, guide star catalog updates, PSF library updates, other software updates, and/or the like originating from the central server 200 or other appropriate computing device (e.g., central computing device(s) 110 and/or distributed computing device(s) 120) to processor 170 or other appropriate satellite component(s). Various components of the satellite 140 will now be described in more detail.

Exemplary Star Tracker Camera or Telescope 150

In various embodiments, the satellite 140 may comprise a star tracker camera or telescope 150. In various embodiments, the star tracker camera or telescope 150 is configured to capture image data and/or images of one or more guide stars. In certain embodiments, the star tracker camera or telescope 150 may use a high-speed charge-coupled device (CCD) camera—utilizing either a frame-transfer CCD or an Electro-Multiplication CCD (EMCCD, also known as an L3CCD for Low-Light-Level CCD) in this regard. Other embodiments may, however, utilize a complementary metal-oxide semiconductor (CMOS) star tracker sensor, including Active Pixel Sensor technologies. In still other embodiments, any of a variety of cameras and/or sensors may be utilized, as may be desirable.

Exemplary Guide Star Catalog 160

In various embodiments, a guide star catalog 160 may be stored in memory onboard satellite 140. In some embodiments, the guide star catalog 160 is a whole sky catalog comprising information/data such as the position and magnitude of stars brighter than a maximum magnitude, $M_{max}$. In various embodiments, the guide star catalog 160 includes photometric data, optical magnitude(s), guide star spectrum data, and/or the like as appropriate for the star tracker camera or telescope 150. In various embodiments, the guide star catalog 160 may be occasionally or periodically updated by the central server 200 or other appropriate computing device (e.g., central computing device(s) 110 and/or distributed computing device(s) 120).

Exemplary PSF Library 190

In various embodiments, a PSF library 190 may be stored in memory on board the satellite 140. The PSF library may store one or more simulated point spread function images based on the theoretical or observed performance of star tracker camera or telescope 150 (e.g., the raw PSF), an angular velocity that the satellite may slew at (e.g., as effects the frame smearing, etc.), a roll angle of the satellite, and/or the like. In various embodiments, the PSF library may store full image PSF images. For example, the PSF image may simulate the PSF of the star tracker camera or telescope 150 across the entire field of view of the star tracker camera or telescope 150. In various embodiments, the PSF library may store and/or allow the processor 170 to select and retrieve PSF postage stamps or PSF sub-images (e.g., portions of the full image PSF images). For example, in one embodiment, the central server 200 or the processor 170 may calculate/simulate one or more PSF images which are then stored on board the satellite 140 in the PSF library 190. The processor 170 may then access, select, and/or retrieve one or more PSF images, postage stamps, and/or sub-images during the pre-planning and/or slewing portion of a repointing event.

In particular, the PSF images (full images, postage stamps, or sub-images) may be used to analyze and/or interpret images and/or image data collected/captured by the star tracker camera or telescope 150. In one embodiment, the PSF library 190 has a resolution of 0.5 pixels per frame smearing. For example, the PSF library 190 may contain simulated PSF images for the raw PSF, the raw PSF with 0.5 pixel smear, the raw PSF with 1.0 pixel smear, and the like up to the raw PSF with 1.0 pixel per frame beyond the maximum expected smearing. In various embodiments, the maximum expected smearing may be determined based on a maximum expected angular momentum of the satellite. For example, the PSF library 190 may store the information/ data and/or images necessary to use the guide star data stored in the guide star catalog 160 to determine/calculate an expected star tracker image corresponding to a star tracker image acquired via the star tracker camera or telescope 150 (e.g., such as illustrated in FIGS. 4A and 4B).

Exemplary System Operation

Various embodiments of the present invention provide a robust integrated precision high-speed attitude determination and control system (ADCS) for satellites. A prominent feature of the ADCS is closely integrating the attitude determination portion of the system (and the calculations/algorithms/etc. associated therewith) with the attitude control portion (along with the calculations/algorithms/etc. associated therewith, as well). Such a configuration enables improved performance and accuracy, in that the knowledge of attitude control allows enhancements to attitude determination calculations (and vice versa). Faster, more robust control algorithms contribute to this improved performance and accuracy.

Various embodiments of the present invention also provide improved image processing algorithms, which improve not only the robustness for pointing stabilization and slewing, but also enable significant enhancements to achievable controlled slew rates (i.e., much higher rates are possible) and overall repointing time (i.e., much less time involved due at least in part to higher rates and improved accuracy). These two features, namely improved controllable slew rates and reductions in overall repointing time are a premium concern for many current satellite systems, applications, and providers thereof. Non-limiting applications include the use of satellites and the repositioning thereof for transportation, surveillance, and military purposes and the like.

Various embodiments of the present invention are configured such that when a repointing request is placed, a planned slew trajectory is calculated (referred to herein as the planned slew trajectory). The planned slew trajectory may then be relayed to the star tracker. For example, the planned trajectory may describe the region that is predicted to be viewable by the star tracker camera or telescope 150 as the satellite conducts the repointing, the velocity profile of the satellite along the trajectory, and/or other parameters related to the trajectory of the satellite during the repointing event. The planned trajectory may be described in a time dependent manner. The star tracker may then, via its computer system or otherwise (e.g., via processor 170), use this information to select a guide star sample from the guide star catalog 160 covering the planned trajectory. Such pre-selection enables a reduction in the computation time and the resources necessary therefor during the slew movement itself. In certain embodiments, the star tracker may utilize a high-speed CCD—either a frame-transfer CCD or an Electro-Multiplication CCD (EMCCD, also known as an L3CCD for Low-Light-Level CCD) in this regard. Other embodiments may, however, utilize a CMOS star tracker sensor, including Active Pixel Sensor technologies. In still other embodiments, any of a variety of cameras and/or sensors may be utilized, as may be desirable.

According to various embodiments, the guide star sample, which enables determination of accuracy of slew based upon comparison thereof to real-time active slewing position images (as will be described elsewhere herein). In certain embodiments, an additional buffer zone of approximately two degrees may be included within the guide star sample (e.g., guide stars having positions that are not aligned with the planned trajectory but are within two degrees thereof), so as to ensure, should for whatever reason the satellite slew up to two degrees from the planned slew trajectory, recalculation may be maintained without the satellite becoming "lost." In other embodiments, larger or smaller buffer zones may be selected for inclusion within the reduced-set sample of guide stars, as may be desirable.

As a non-limiting example of the benefits provided via this approach according to various embodiments, for a slew of 90 degrees, such would require a guide star sample having approximately 1000 square degrees of star coverage—2.5% of the full sky guide star catalog 160 (as may be stored in association with the system and the star tracker). Thus search speed in this non-limiting example could be increased by up to forty times that previously obtainable.

Once the planned trajectory path has been calculated and a desirable guide star sample selected (e.g., based on the planned trajectory path and/or including a buffer therearound), various embodiments are configured to select a slew-mode sensor integration time (e.g., an exposure time for each collected/captured image and/or corresponding image data). A common challenge when active slewing (i.e., slewing with the satellite and telescope turned on) is image smearing. Such is due at least in part to the speed capabilities of incorporated star tracker cameras or telescopes within the satellite. Using conventional procedures, whereby a two-dimensional picture is taken of a star for purposes of measuring its centroid and comparing the same to where its centroid should be located (e.g., from the guide star catalog 160 described elsewhere herein), if the slew speed is sufficiently fast enough, images can become blurry and/or distorted, thus introducing inaccuracies into attitude determination and control calculations. In particular, the star tracker camera or telescope 150 collects/captures image data over the course of the slew-mode sensor integration time. If the satellite 140 is slewing as the star tracker camera or telescope 150 collects/captures image data, the resulting image will be smeared by an amount depending on the slew-mode sensor integration time and the angular velocity at which the satellite is slewing while the image data is being collected/captured. For example, FIG. 4A shows an example star tracker image captured when the satellite was slewing at 0 degrees per second and with a sensor-mode integration time of 0.01 seconds. FIG. 4B shows a second example star tracker image captured when the satellite was slewing at 10 degrees per second and with a sensor-mode integration time of 0.01 seconds.

While conventional slew rates have been constrained because of the above smearing concerns to approximately one to two degrees of movement per second, via the improved control mechanisms of various embodiments of the present invention, slew rates of up to 10 degrees per second are obtainable with acceptable and minimal occurrences of smearing. In certain embodiments less than 10 degrees per second or more than 10 degrees per second is achievable. For example, in some embodiments having reasonable hardware configurations compatible with many modern satellites, the slew rates of up to 20 degrees per second or more are achievable. In these and other embodiments, it is desirable to reduce the slew-induced image smearing to less than ten pixels per frame time or exposure for the peak angular velocity. In at least one embodiment, smearing is maintained at less than one pixel per frame time for the peak angular velocity. For typical pixel sizes of approximately one arcminute, this minimal smearing approach is valid for slew rates of up to approximately 1.6 degrees per second with slew-mode sensor integration times of 0.01 seconds. Even at those slew rates as high as approximately 10 degrees per second, the image smearing induced by slewing is only approximately six pixels per exposure, which in many embodiments remains acceptable and feasible.

As previously described, the star tracker camera or telescope 150 is configured according to various embodiments to collect/capture one or more images and/or image data during slewing and to compare calculated parameters associated with one or more stars identified therein to star parameters based upon information/data contained within a guide star catalog 150. According to various embodiments, the selection of a guide star sample selected from the guide star catalog 160 and creation of a PSF library is performed along with and based at least in part upon the calculation of the planned slew trajectory and the selection of a slew-mode sensor integration time, prior to commencing slewing itself. In certain embodiments, these steps or tasks may be completed in approximately half a second of computational time. In at least one embodiment, the three steps or tasks may be completed in less than half a second of computational time.

In certain embodiments, the creation of the PSF library may be pre-calculated further prior to the remaining steps. For example, during "pre-planning" the processor 170 may select a set of PSF postage stamps from the PSF library 190. In such embodiments, the "pre-planning" tasks will merely involve calculating the planned slew trajectory and based at least in part thereon selecting the appropriate set of PSF postage stamps from the PSF library 190 and selecting the guide star sample from the guide star catalog 160, as described in detail elsewhere herein. The selection of the appropriate set of PSF postage stamps may be based on the planned slew trajectory (e.g., the predicted angular velocity during the slew) and the selected or predetermined slew-mode sensor integration time. In these and still other embodiments, these steps or tasks may be completed in in less than half a second of computational time.

As noted above, according to various embodiments, the processor 170 creates a small library or set of "postage stamp" or "postage stage" or "postage stamp sized" sub-images of simulated PSFs, including any expected smearing, as a function of angular velocity during the anticipated slew. In some embodiments, a complete PSF library may be pre-calculated (e.g., by the PSF calculation module 500 operating on the central server 200) and stored in memory on board the satellite 140 as the PSF library 190. The processor 170 may then select a subset of the PSF images stored in the PSF library 190 as appropriate for each repointing event. In some embodiments, only a raw PSF image (the PSF simulated from the predicted or observed performance of the star tracker camera or telescope 150) is stored between repointing events and the processor 170 will generate a PSF library wherein the anticipated frame smearing and/or satellite roll are added to the raw PSF to create a library of PSF images, sub-images, and/or postage stamps from which the set of PSF postage stamps may be selected.

In certain embodiments, the resolution for the PSF library 190 stored images and/or the selected set of PSF postage stamps will be approximately 0.5 pixels per frame smearing (i.e., raw PSF, raw+0.5 pix smear, raw+1.0 pix smear) up to approximately one pixel per frame smearing beyond the maximum expected smearing based upon the planned trajectory and the selected exposure time, as detailed above. In other words, the library will include at least some degree of buffer with respect to the degree of smearing, up to at least one pixel per frame smearing above the pixels per frame smearing expected (e.g., 7 pixels/frame where 6 pixels/frame is expected, etc.). In other embodiments, still greater buffer values, beyond 1.0 pixel per frame may be created and stored, as may be desirable.

According to various embodiments, the PSF resolution of images within the PSF library 190 may also include a range of "roll" values as well, in addition to slew-concerned or smearing-concerned values. Still other values may be incorporated, so as to improve and/or enhance accuracy of PSF images with respect to expected clarity/smearing of real-time obtained images during slewing. In this manner, it should be understood that the attitude determination calculation is provided at a greater degree of accuracy than previously obtainable, which in turn translates into a greater degree of accuracy in attitude control given the consolidated and integrated ADCS provided herein according to various embodiments.

According to various embodiments, once the planned slew trajectory has been calculated by the system, the slew-mode sensor integration time has been selected (by the system or via user input), the pertinent set of PSF postage stamps has been selected from the PSF library 190, and the pertinent guide star sample has been selected from the guide star catalog 160, "pre-planning" activities are considered complete such that slewing of the satellite may commence. Various alternative "pre-planning" activities may be provided, in the recited order or otherwise, as may be desirable for certain applications. For example, as noted above, at least some portion of the PSF library may be pre-calculated and stored on-disk, at the satellite or elsewhere (e.g., accessible via one or more networks or otherwise).

According to various embodiments, once slewing of the satellite begins, the ADCS system is configured to enter a loop. Loop steps or tasks comprise acquiring an image via the star tracker camera or telescope 150; using current attitude information (e.g., current attitude, current angular moment) to estimate expected positions of at least one of the guide stars from the guide star sample; selecting the estimated PSF from the set of PSF postage stamps; calculating a cross-correlation function (CCF) based on the expected guide star postion(s), the estimated PSF, and the acquired image to determine X, Y coordinate shifts (e.g., right ascension and declination, other celestial coordinates, or other appropriate coordinate system coordinates) of the viewed star as compared to the expected position; using the determined coordinate shifts to update/correct the current attitude information (including angular velocity and/or roll angle) for the next iteration or exposure frame; and returning back to acquiring another image and repeating the steps or tasks until slewing is stopped.

In certain embodiments, the current attitude information used may include angular velocity—either from inertial mass units or from an optical detector or otherwise). In certain embodiments, the system is configured to use the current attitude information to estimate expected positions of guide stars (e.g., stars brighter than a desired magnitude, $M_{max}$ or other brightness parameter), which positions may be obtained from the star catalog 160 and/or the guide star sample described previously herein.

In certain embodiments, the selection of the set of estimated PSF postage stamps from the PSF library 190 is based upon the current angular velocity information. In other embodiments, additional parameters, such as roll angle, slew-mode sensor integration time or otherwise, may also be accounted for in this selection and determination.

In certain embodiments, the calculation of the cross-correlation function (CCF) determines at least a shift in position X, Y (e.g., X, Y coordinates) of each star compared to the expected position thereof. Those shifts in coordinates, including angular velocity and/or roll angle, may be determined with an accuracy of approximately one arcsecond or better for typical star fields. Greater or lesser accuracy may be obtainable in other embodiments or for various star fields.

According to various embodiments, once the slewing has stopped, the system is configured to enable the star tracker and/or satellite to resume "staring mode." In other words, the star tracker exits from a "slewing mode," as such may be understood to comprise at least the loop of tasks or steps previously described herein. In various embodiments, the staring mode may be configured to prevent excessive attitude drift between repointing events.

According to various embodiments, the cross-correlation function (CCF) approach described elsewhere herein comprises executing Fast Fourier Transforms on modern computers via one or more computer processors. This CCF analysis determines an offset relative to a pre-determined X, Y coordinate system, which tells you not only "shifts" as previously described herein but also the correlation amplitude—thus determining quality of match relative to the pertinent guide stars. In other words, if real-time blurring or smearing diverges from expected blurring or smearing, the system is aware of such and may notify users thereof accordingly. Options available to the system if divergences occur include the non-limiting examples of correcting the divergence, expanding the window of the viewed sub-images (up to and including full view), or ceasing further slewing or movement. Thus, instead of waiting to the end or completion of a slew to correct divergences, various embodiments of the ADCS system provided herein provide rectification capabilities on a real-time continuous basis throughout the duration of the slew.

As mentioned, the CCF calculations performed by various embodiments of the system described herein deliver not only the position shift (as do conventional centroid-based calculation algorithms, with dependence upon X, Y coordinate systems), but also the correlation amplitude. For instance, in typical windowed (e.g., postage stamp sized views or sub-views of images) centroid calculations, if the PSF extends beyond the window, the centroid will return an erroneous position measurement, which will continue until either the star is entirely lost from view or correction somehow occurs. During such time, however, there is no "warning" to users of such systems or otherwise that the star is slipping out of reach and thus that the satellite is going off course in terms of slewing. Various embodiments of the ADCS system described herein address these challenges and/or difficulties.

According to various embodiments, the ADCS system may be configured such that if the CCF peak value drops below an acceptable quality level, a re-calculation of the CCF using larger postage stamp windows may be triggered, so as to recover the "lock quality" of the slewing. In certain embodiments, if the increased postage stamp size again produces a low peak CCF quality level, the system is configured to carry out a full-image cross-correlation to attempt to recover the position lock. In these and still other embodiments, if all levels of tracking or enlarging of the PSF image fail, the ADCS system is configured to stop slewing and begin a comprehensive "lost in space" calculation to re-acquire the satellite attitude lock and restart the slew therefrom. In various embodiments any combination of these steps for enlargement and re-calculation may be performed, as may be desirable. It should be understood, however, that according to various embodiments, the described iterative approach, focusing both on position shift and correlation amplitude provides an improved robustness to in-slew attitude determination and attitude control calculations as compared to previous centroid-based approaches.

An additional advantage provided by the ADCS system and various embodiments thereof as described herein is the ability to implement real-time feedback to the attitude control system portion thereof, thus allowing adjustment of trajectory during the slew process. This not only reduces the risk of losing lock during the slew but also allows for improved trajectory termination, with minimal "settle time."

Further advantages provided by various embodiments of the ADCS system are that while most existing systems are present and feasible on large satellites, implementation upon smaller, more mobile satellites remains problematic. Slew rate and robustness are at a premium in the small satellite field, particularly for remote sensing, defense/military, and astronomy applications, to name a few non-limiting examples. Thus, various embodiments as described herein provide increased productivity and accuracy and also reduce risk of loss or damage to oftentimes quite valuable satellite systems. In addition, various embodiments are also compatible across small and large scale satellite form factors, wherein for at least those small applications, no precision pointing systems have been demonstrated as of yet.

Example Repointing Event

FIGS. 4-6 provide flowcharts illustrating some of the processes and procedures that may be completed before and/or during a repointing event in accordance with various embodiments of the present invention. As shown in FIG. 5, the repointing event begins with pre-planning at step 802 when a repointing request is received. For example, the central server 200 or other appropriate computing device (e.g., central computing device(s) 110 and/or distributed computing device(s) 120) may transmit a repointing request to the satellite 140. The repointing request may be received by the ADCS aboard the satellite 140 and provided to the processor 170 via the communication interface. In various embodiments, the repointing request may comprise a desired satellite attitude, the location of a target for observation via one or more sensors on board the satellite 140, a target time for completing the repointing, and/or the like.

At step 804, the processor 170 may determine/calculate a planned slew trajectory based on the repointing request, the current attitude of the satellite, and/or the like. For example, the planned slew trajectory may be based on the relative orientation of one or more science instruments or solar panels with relation to the sun. In various embodiments, the planned slew trajectory may describe the positions expected to be within the view of the star tracker camera or telescope 150 as the satellite slews, the expected velocity profile of the satellite during the repointing event, and/or the like. The positions expected to be within the view of the star tracker camera or telescope 150 may be described in celestial coordinates, a predefined X, Y coordinate system, or other coordinate system as appropriate for the application. In one embodiment, the central server 200 may determine/calculate a planned slew trajectory and provide the same to the satellite 140. In an example embodiment, the velocity profile is predetermined. For example, the velocity profile for the repointing event may be a velocity of 0 degrees per second for one second followed by a an acceleration to a maximum velocity of approximately 10.0 degrees per second over a two second acceleration interval. The attitude velocity may then remain at the maximum velocity until decelerating for the final two seconds to come to rest at the desired target attitude for the slew, as indicated by the repointing request.

FIGS. 7A, 7B, and 7C show aspects of a sample planned slew trajectory. FIG. 7A shows the planned X and Y coordinates (e.g., angles) of the satellite as a function of time in a predefined celestial or spherical X, Y coordinate system. FIG. 7B shows the planned velocity profile of the sample planned slew trajectory and FIG. 7C shows the projection on the sky, or in any predefined celestial or spherical X, Y coordinate system, of the planned trajectory.

Returning to FIG. 6, at step 806, a guide star sample may be selected from the guide star catalog 160 based on the planned slew trajectory. For example, guide stars (e.g., stars brighter than a predetermined threshold magnitude, $M_{max}$) that are located along/within the planned slew trajectory or within a predetermined buffer thereof (e.g., within two degrees of the planned slew trajectory) may be selected for inclusion in the guide star sample. For example, the guide stars selected for the guide star sample may be located along a planned trajectory as illustrated in FIG. 7C, or within a buffer zone around the planned trajectory. At step 808, a slew mode sensor integration time is selected. The slew mode sensor integration time may be selected such that the image smearing cause by the slewing is less than a maximum image smear while still providing the star tracker camera or telescope 150 enough integration time to acquire images having sensitivities reaching the threshold magnitude, $M_{max}$. In various embodiments, the slew mode sensor integration time may be predetermined.

At step 810, a set of PSF postage stamps is selected and/or generated based on the expected image smearing (e.g., based on the slew mode sensor integration time and/or expected angular momentum) and/or the like. For example, a set of the PSF postage stamps may be selected and/or retrieved from the PSF library 190. In one embodiment, instead of accessing a PSF library, the processor may determine/ calculate estimated PSF images, sub-images, and/or postage stamps as part of the slew preparation. For example, a set of PSF postage stamps may be determined/calculated prior to beginning slewing for each repointing event based on the planned slew trajectory and/or slew-mode sensor integration time for the repointing event.

Once the pre-planning is complete, the ADCS enters slew mode and repointing may begin. For example, the slew control system 145 may cause the satellite 140 to begin to slew along the planned slew trajectory. FIG. 6 illustrates processes and procedures that may be completed during the repointing of the satellite 140, according to various embodiments.

At step 852, an image is acquired. For example, the star tracker camera or telescope 150 may capture an image and/or image data based on the selected slew mode sensor integration time and provide the image and/or image data to the processor 170. At step 854, the expected positions of one or more guide stars in the guide star sample may be determined/calculated. The expected positions of the one or more guide stars may be determined/calculated based on the current attitude information. For example, the processor 170 may receive information related to the angular velocity of the satellite 140 (e.g., instantaneous angular velocity, average angular velocity over the selected slew mode sensor integration time, peak angular velocity over the selected slew mode sensor integration time, and/or the like). Based on the angular momentum and previously known position/ attitude of the satellite 140, the processor 170 may determine/calculate the expected current position/attitude of the satellite 140 and the expected position of one or more guide stars in the guide star sample.

At step 856, the processor 170 may select the appropriate PSF postage stamp based on the angular velocity of the satellite 140. At step 858, the selected PSF postage stamp may be applied and a CCF determined/calculated. In various embodiments, the PSF postage stamp may be applied to the acquired image to determine/calculate an observed position for one or more detected guide stars. In one embodiment, PSF postage stamp may be applied to the expected positions and magnitudes of one or more guide stars of the guide star sample to determine/calculate an expected image for comparison with the acquired image. The CCF may be calculated using a Fast Fourier Transform (FFT) and/or the like to determine the X, Y coordinate shifts of the detected one or more guide stars as compared to the expected positions of the one or more guide stars and the correlation amplitude.

At step 860, the processor determines if the correlation amplitude is greater than a predetermined threshold. The correlation amplitude describes the quality of the cross-correlation between the one or more detected guide star positions and the expected one or more guide star positions based on the selected PSF postage stamp. If the correlation amplitude is below the predetermined threshold, the processor 170 continues to step 880, shown in FIG. 8.

At step 880, a larger PSF sub-image is selected and the CCF is determined/calculated based on the larger PSF sub-image. For example, the processor 170 may select a larger PSF sub-image from the PSF library 190. In some situations, the PSF may extend beyond the original postage stamp selected and a larger PSF sub-image will better describe the data encoded within the acquired image. At step 882, it is determined if the correlation amplitude based on the CCF determined/calculated with the larger PSF sub-image is greater than the predetermined threshold. For example, the processor 170 may compare the correlation amplitude of the CCF determined/calculated with the larger PSF sub-image to the predetermined threshold to determine if the cross-correlation is of sufficient quality. If the correlation amplitude is greater than the predetermined threshold, the processor 170 may continue to step 862, as illustrated in FIG. 6. If the correlation amplitude is not greater than the predetermined threshold, the processor 170 may continue to step 884.

At step 884, the full image PSF image is used to determine/calculate the CCF. For example, the processor 170 may determine/calculate the CCF using the full image PSF, rather than a postage stamp or larger PSF sub-image. At step 886, it is determined if the correlation amplitude determined/calculated from the CCF using the full image PSF image is greater than the predetermined threshold. For example, the processor 170 may compare the correlation amplitude determined/calculated from the CCF using the full image PSF image is greater than the predetermined threshold and therefor of sufficient quality. If the correlation amplitude is greater than the predetermined threshold the processor 170 may continue to step 862, as illustrated in FIG. 6. If the correlation amplitude is not greater than the predetermined threshold, the processor 170 continues to step 888.

At step 888, the slewing of the satellite is stopped, and a lost in space calculation is completed to determine the position/attitude of the satellite 140. For example, additional guide stars from guide star catalog 160, in addition to the guide stars of the reduced-set sample guide stars, may be used to determine the position/attitude of the satellite 140. In another example, one or more PSF images, postage stamps, or sub-images may be selected from the PSF library 190 or generated for completing the comprehensive lost in space calculation. Thus, the processor 170 may complete a lost in space calculation to re-acquire the satellite attitude lock. Once the attitude lock is re-acquired, the slew may be restarted. In the embodiment illustrated in FIG. 8, the processor 170 then continues to step 864 illustrated in FIG. 6. In another embodiment, the processor 170 may return to step 804 to determine a new planned slew trajectory based on the current position/attitude of the satellite 140 before re-starting the slew.

As noted above, if at any of steps 860, 882, or 886, the correlation amplitude is greater than the predetermined threshold, the processor 170 continues to step 862, to determine/correct the current satellite attitude. For example, based on the determined/calculated X, Y coordinate shifts of the detected one or more guide stars as compared to the expected positions of the one or more guide stars, the actual attitude of the satellite 140 may be determined/calculated. For example, if the determined/calculated X, Y coordinate shifts of the detected one or more guide stars indicate that the one or more detected guide stars is shifted two arcminutes from the expected position of the one or more guide stars, the processor 170 may determine that the attitude of the satellite 140 is shifted by two arcminutes from the expected attitude as predicted by the planned slew trajectory or the current attitude information used to determine the expected guide star position(s) at step 854.

Next, at step 864, it is determined if the slew is complete. For example, the processor 170 may determine if the current attitude of the satellite 140 is within a predetermined range of the desired attitude as determined by the repointing request. If the slew is complete, the slew control system 145 may cause the satellite 140 to stop slewing and the satellite may exit the slewing mode and enter staring mode star tracking (e.g., to prevent excessive attitude drift between repointing events). If, at step 864, it is determined that the slew is not complete, the processor 170 returns to step 852 and acquires a new image or image data from the star tracker camera or telescope 150.

CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for providing integrated attitude determination and attitude control for slewing of a satellite, said method comprising the steps of: after receiving a repointing request, selecting, via one or more processors, a guide star sample comprising one or more guide stars from a guide star catalog, wherein each guide star selected for the guide star sample has a measured brightness brighter than a predetermined value; determining, via the one or more processors, current attitude information; selecting and retrieving, via the one or more processors, at least one point spread function (PSF) image from a PSF library, the selection based at least in part on the current attitude information; estimating, via the one or more processors and based at least in part upon the current attitude information, an expected position for at least one guide star, the at least one guide star being one of the guide stars of the guide star sample; acquiring, via one or more processors and at least one image capture device on the satellite, at least one star tracker image; calculating, via the one or more processors, a cross-correlation function (CCF) based on a sub-image of the selected and retrieved PSF image, the star tracker image, and the expected position for the at least one guide star, the calculation determining shifts in position of the at least one guide star compared to the expected position; and determining, via the one or more processors, updated current attitude information based at least in part on the determined shifts in position.

2. The computer-implemented method according to claim 1, wherein the method further comprises the steps of: upon receipt of the satellite repointing request and prior to acquiring the at least one star tracker image, calculating, via the one or more processors, a planned slew trajectory; and selecting, via the one or more processors, the one or more guide stars of the guide star sample based at least in part on the planned slew trajectory.

3. The computer-implemented method according to claim 2, wherein the guide star sample includes one or more guide stars located within a buffer zone of approximately two degrees surrounding the planned slew trajectory.

4. The computer-implemented method according to claim 2, wherein the method further comprises the steps of: based at least in part upon the planned slew trajectory, selecting a slew-mode sensor integration time; and prior to acquiring the at least one star tracker image, creating, via the one or more processors and based at least in part on the selected slew-mode sensor integration time, the at least point spread function (PSF) image and storing the PSF image in the PSF library.

5. The computer-implemented method according to claim 4, wherein the selected slew-mode sensor integration time is configured to provide image smearing of less than six pixels per frame.

6. The computer-implemented method according to claim 4, wherein the selected slew-mode sensor integration time is configured to provide image smearing of less than one pixel per frame.

7. The computer-implemented method according to claim 4, wherein resolution of the created PSF image is between 0.5 pixels per frame smearing and one pixel per frame smearing.

8. The computer-implemented method according to claim 4, wherein the steps of (a) calculating the planned slew trajectory, (b) selecting the one or more guide stars for the guide star sample, the one or more guide stars located along the planned trajectory and/or a within a buffer zone surrounding the planned trajectory, (c) selecting the slew-mode sensor integration time, and (d) creating the at least one point spread function (PSF) image and storing the PSF image in the PSF library are performed subsequent to receipt of a satellite repointing request and prior to acquiring a star tracker image.

9. The method according to claim 4, wherein the steps of (a) calculating the planned slew trajectory, (b) selecting the one or more guide stars for the guide star sample, the one or more guide stars located along the planned trajectory and/or a within a buffer zone surrounding the planned trajectory, and (c) selecting the slew-mode sensor integration time are performed subsequent to receipt of a satellite repointing request and prior to acquiring a star tracker image and require less than one half of a second of computation time.

10. The computer-implemented method according to claim 9 wherein the step of creating the at least one point spread function (PSF) image and storing the PSF image in the PSF library is performed further prior to receiving the satellite repointing request.

11. The computer-implemented method according to claim 1, wherein the recited configuration enables slewing of the satellite at a slew rate of up to ten degrees per second.

12. The computer-implemented method according to claim 1, wherein the recited configuration enables slewing of the satellite at a slew rate of approximately three to four degrees per second.

13. The computer-implemented method according to claim 1, wherein the current attitude information includes angular velocity obtained from at least one of inertial mass units or from an optical detector.

14. The computer-implemented method according to claim 1, wherein the calculated CCF not only determines shifts in position of at least one guide star compared to the expected position of the at least one guide star, but also determines a correlation amplitude, the correlation amplitude being representative of a quality of the position determination.

15. The computer-implemented method according to claim 14, further comprising the steps of: determining, via the one or more processors, that the calculated correlation amplitude is less than a predetermined value representative of a minimum quality level; and triggering, via the one or more processors, a re-calculation of the CCF using a larger PSF image to recover an acceptable lock quality.

16. The computer-implemented method according to claim 15, wherein the larger PSF image is a full-image PSF, so as to attempt to recover the acceptable lock quality.

17. The computer-implemented method according to claim 1, wherein determining the updated current attitude information, based at least in part upon the determined shifts in position and a quality thereof is performed with an accuracy of at least one arcsecond.

18. The computer-implemented method according to claim 1, wherein the at least one image capture device on the satellite uses at least one of a high speed CCD or a CMOS star tracker sensor.

19. The computer-implemented method according to claim 18, wherein the high speed CCD is at least one of a frame-transfer CCD or an Electron-Multiplication CCD (EMCCD).

20. An integrated attitude determination and attitude control system for use on a satellite, said system comprising: a memory configured to store information associated with the satellite; and one or more processors configured to: upon receipt of a repointing request, select a guide star sample comprising one or more guide stars from a guide star catalog, wherein each guide star selected for the guide star sample has a measured brightness brighter than a predetermined value; determine current attitude information; select and retrieve at least one point spread function (PSF) image from a PSF library, the selection based at least in part on the current attitude information; estimate, based at least in part upon the current attitude information, an expected position for at least one guide star, the at least one guide star being one of the guide stars of the guide star sample; acquire, via at least one image capture device on the satellite, at least one star tracker image; calculate a cross-correlation function (CCF) based on a sub-image of the selected and retrieved PSF image, the star tracker image, and the expected position for the at least one guide star, the calculation determining shifts in position of the at least one guide star compared to the expected position; and determine updated current attitude information based at least in part on the determined shifts in position.

21. The system according to claim 20, wherein the one or more processors are further configured to: upon receipt of the satellite repointing request and prior to acquiring the at least one star tracker image, calculate a planned slew trajectory; and select the one or more guide stars of the guide star sample based at least in part on the planned slew trajectory.

22. The system according to claim 21, wherein the guide star sample includes one or more guide stars located within a buffer zone of approximately two degrees surrounding the planned slew trajectory.

23. The system according to claim 21, wherein the one or more processors are further configured to: based at least in part upon the planned slew trajectory, select a slew-mode sensor integration time; and prior to acquiring the at least one star tracker image, create, based at least in part on the selected slew-mode sensor integration time, the at least point spread function (PSF) image and storing the PSF image in the PSF library.

24. The system according to claim 23, wherein the selected slew-mode sensor integration time is configured to provide image smearing of less than six pixels per frame.

25. The system according to claim 23, wherein the selected slew-mode sensor integration time is configured to provide image smearing of less than one pixel per frame.

26. The system according to claim 23, wherein resolution of the created PSF image is between 0.5 pixels per frame smearing and one pixel per frame smearing.

27. The system according to claim 23, wherein the steps of (a) calculating the planned slew trajectory, (b) selecting the one or more guide stars for the guide star sample, the one or more guide stars located along the planned trajectory and/or a within a buffer zone surrounding the planned trajectory, (c) selecting the slew-mode sensor integration time, and (d) creating the at least one point spread function (PSF) image and storing the PSF image in the PSF library are performed subsequent to receipt of a satellite repointing request and prior to acquiring a star tracker image.

28. The system according to claim 23, wherein the steps of (a) calculating the planned slew trajectory, (b) selecting the one or more guide stars for the guide star sample, the one or more guide stars located along the planned trajectory and/or a within a buffer zone surrounding the planned trajectory, and (c) selecting the slew-mode sensor integration time are performed subsequent to receipt of a satellite repointing request and prior to acquiring a star tracker image and require less than one half of a second of computation time.

29. The system according to claim 28, wherein the step of creating the at least one point spread function (PSF) image and storing the PSF image in the PSF library is performed further prior to receiving the satellite repointing request.

30. The system according to claim 20, wherein the recited configuration enables slewing of the satellite at a slew rate of up to ten degrees per second.

31. The system according to claim 20, wherein the recited configuration enables slewing of the satellite at a slew rate of approximately three to four degrees per second.

32. The system according to claim 20, wherein the current attitude information includes angular velocity obtained from at least one of inertial mass units or from an optical detector.

33. The system according to claim 32, wherein the current attitude information further includes angular roll data.

34. The system according to claim 20, wherein the calculated CCF not only determines shifts in position of at least one guide star compared to the expected position of the at least one guide star, but also determines a correlation amplitude, the correlation amplitude being representative of a quality of the position determination.

35. The system according to claim 34, wherein the one or more processors are further configured to: determining, via the one or more processors, that the calculated correlation amplitude is less than a predetermined value representative of a minimum quality level; and triggering, via the one or more processors, a re-calculation of the CCF using a larger PSF image to recover an acceptable lock quality.

36. The system according to claim 35, wherein the larger PSF image is a full-image PSF, so as to attempt to recover the acceptable lock quality.

37. The system according to claim 20, wherein the determining of the updated current attitude information is based at least in part upon the determined shifts in position and a quality thereof is performed with an accuracy of at least one arcsecond.

38. The system according to claim 20, wherein the at least one image capture device on the satellite uses at least one of a high speed CCD or a CMOS star tracker sensor.

39. The system according to claim 38, wherein the high speed CCD is at least one of a frame-transfer CCD or an Electron-Multiplication CCD (EMCCD).

40. The system according to claim 20, wherein the satellite is a small-scale satellite.

41. The system according to claim 40, wherein the small-scale satellite is configured for at least one of remote sensing, defensive military sensing, or astronomy-oriented applications.

42. A non-transitory computer readable medium comprising: at least one computer-readable storage medium having computer-readable program code portions embodied therein, the computer-readable program code portions comprising: an executable portion configured for, after receiving a repointing request, selecting a guide star sample comprising one or more guide stars from a guide star catalog, wherein each guide star selected for the guide star sample has a measured brightness brighter than a predetermined value; an executable portion configured for determining current attitude information; an executable portion configured for selecting and retrieving at least one point spread function (PSF) image from a PSF library, the selection based at least in part on the current attitude information; an executable portion configured for estimating, based at least in part upon the current attitude information, an expected position for at least one guide star, the at least one guide star being one of the guide stars of the guide star sample; an executable portion configured for acquiring, via at least one image capture device on the satellite, at least one star tracker image; an executable portion configured for calculating a cross-correlation function (CCF) based on a sub-image of the selected and retrieved PSF image, the star tracker image, and the expected position for the at least one guide star, the calculation determining shifts in position of the at least one guide star compared to the expected position; and an executable portion configured for determining updated current attitude information based at least in part on the determined shifts in position.

43. The non-transitory computer readable medium of Concept 42, the computer-readable program code portions further comprising: an executable portion configured for, after receiving the repointing request and prior to acquiring the at least one star tracker image, calculating a planned slew trajectory; an executable portion configured for selecting the one or more guide stars of the guide star sample based at least in part on the planned slew trajectory; an executable portion configured for, based at least in part upon the planned slew trajectory, selecting a slew-mode sensor integration time; and an executable portion configured for, prior to acquiring the at least one star tracker image, creating, based at least in part on the selected slew-mode sensor integration time, the at least point spread function (PSF) image and storing the PSF image in the PSF library.

* * * * *